United States Patent [19]
Huguenin et al.

[11] Patent Number: 5,455,589
[45] Date of Patent: Oct. 3, 1995

[54] COMPACT MICROWAVE AND MILLIMETER WAVE RADAR

[75] Inventors: George R. Huguenin; Ellen L. Moore, both of South Deerfield, Mass.

[73] Assignee: Millitech Corporation, Deerfield, Mass.

[21] Appl. No.: 178,672

[22] Filed: Jan. 7, 1994

[51] Int. Cl.$^6$ ................................................. G01S 13/00
[52] U.S. Cl. ........................................ 342/175; 343/753
[58] Field of Search .................................. 343/753, 754, 343/755, 756; 342/175

[56] References Cited

U.S. PATENT DOCUMENTS

| | | | |
|---|---|---|---|
| 3,797,020 | 3/1974 | Roger et al. | 343/756 |
| 3,820,116 | 6/1974 | Carlsson et al. | 342/756 |
| 4,114,612 | 9/1978 | Wild | 343/754 |
| 4,127,857 | 11/1978 | Capps et al. | 343/754 |
| 4,214,248 | 7/1980 | Cronson et al. | 343/756 |
| 4,220,957 | 9/1980 | Britt | 343/756 |
| 4,253,100 | 2/1981 | Commault et al. | 343/756 |
| 4,318,103 | 3/1982 | Roettele et al. | 343/18 |
| 4,489,331 | 12/1984 | Salvat et al. | 343/753 |
| 4,491,845 | 1/1985 | Rothenberg | 343/754 |
| 4,509,055 | 4/1985 | Fassett | 343/754 |
| 4,599,623 | 7/1986 | Hawkin et al. | 343/756 |
| 4,901,086 | 2/1990 | Smith | 343/909 |
| 4,975,712 | 12/1990 | Chen | 343/754 |
| 4,977,407 | 12/1990 | Crane | 343/753 |
| 5,175,559 | 12/1992 | Schrank et al. | 343/756 |
| 5,185,613 | 2/1993 | Whatmore et al. | 343/909 |
| 5,264,859 | 11/1993 | Lee et al. | 343/754 |

OTHER PUBLICATIONS

Garrett et al., "Fresnel Zone Plate Antennas at Millimeter Wavelengths", *Internal Journal of Infrared and Millimeter Waves*, 12:3, pp. 195–220, 1991.
Hatcher, B., "Collimation of Row–and–Column Steered Phased Array", *Proceeding of the IEEE*, 56:11, pp. 1787–1790, Nov. 1968.
James et al., "Handbook of Microstrip Antennas", Peter Peregrinus Ltd., vol. 1, p. 725, 1989.
Johnson et al., "Antenna Engineering Handbook", *McGraw–Hill Book Company*, first edition, Chapter 17, pp. 28–31, 1961.
Rudge et al., "The Handbook of Antenna Design", Peter Peregrinnus, vol. 1, pp. 184 and 327–329, 1982.
Goldsmith et al., "Gaussion Optics Lens Antennas", *Microwave Journal*, Jul. 1984.
Lo et al., "Antenna Handbook", Van Nostrand Reinhold Company, Chpaeter 17, pp. 9–11 and 141, 1988.

Primary Examiner—Mark Hellner
Attorney, Agent, or Firm—Pennie & Edmonds

[57] ABSTRACT

Compact microwave and millimeter wave radars operating at 77 GHz and having resolution of no less than 3.2 meters at a distance of 100 meters. The exemplary dimensions of the radars are 145 millimeters in diameter and 100 or 85 millimeters long. The antenna of the radars employs folded optic design, with the actual focal length of the radar being less than that of the lens in the antenna alone.

42 Claims, 6 Drawing Sheets

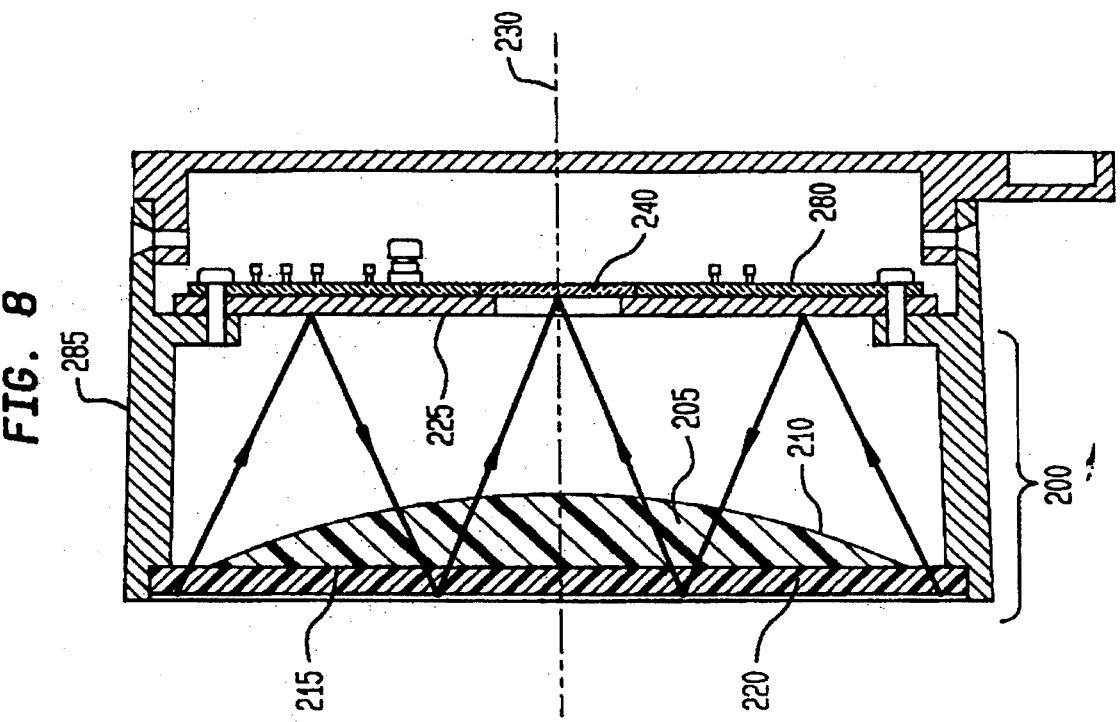
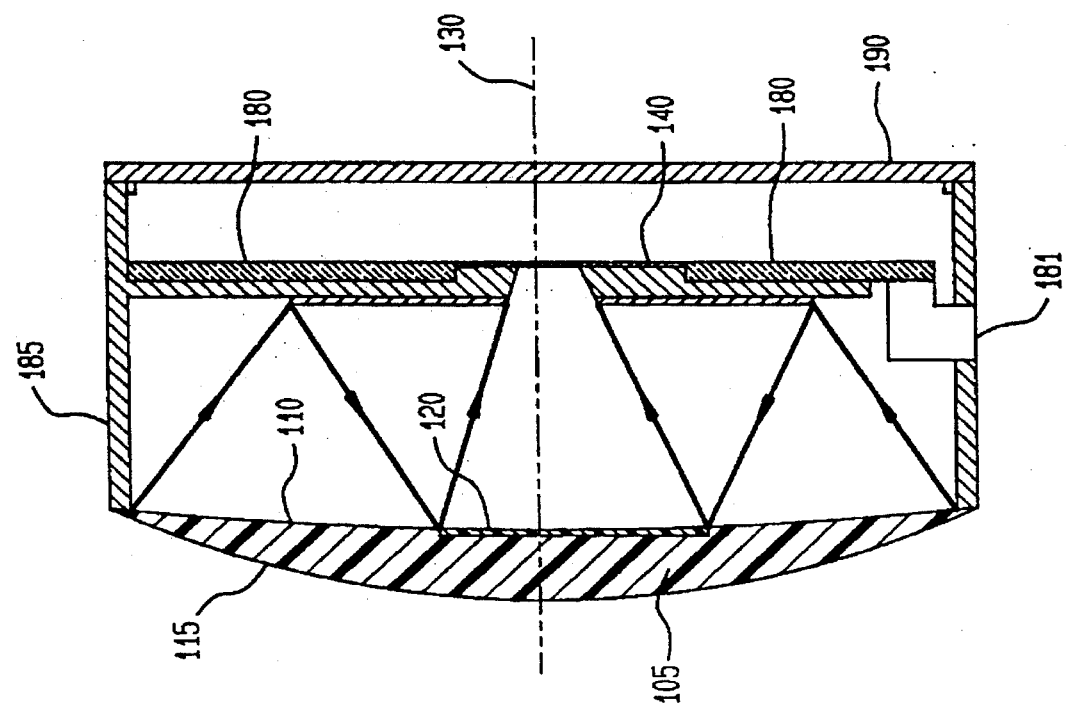

COMPACT MICROWAVE AND MILLIMETER WAVE RADAR

FIELD OF THE INVENTION

The present invention relates to microwave and millimeter-wave radars and more particularly, to compact solid state electronic microwave and millimeter-wave radars. The term "millimeter-wave" is intended to include, broadly, at least the entire millimeter and sub-millimeter regimes (i.e. about 30–3,000 Ghz), and in general any frequency regime permitting a compact vehicular radar.

BACKGROUND OF THE INVENTION

Solid state electronic compact microwave and millimeter-wave ("MM") radars would be useful in many applications, such as in automobiles for detecting the speed and position of other vehicles and objects.

Generally, such radars contains three main components: a transceiver for generating and receiving MM electromagnetic ("EM") radiation, an antenna for collimating and focusing the radiation, and a feed assembly for coupling the radiation from the transceiver to the antenna. In addition to collimating and focusing the emitted radiation, the antenna also receives and focuses the radiation reflected from detected objects, and provides it to the transceiver.

The transceiver comprises primarily a transmission portion and a receiving portion. The transmission portion generates the radiation and the receiving portion receives the radiation reflected from the target and provides output signals from which useful information such as the speed and position of the detected objects can be determined.

An automobile radar should be small in size, to be conveniently mounted in a vehicle, and should preferably have sufficient power to detect targets at about 150 meters away or such other distance as the particular application may require. Additionally, the total power consumed by the radar should be low, e.g. in the range of several watts.

Another important requirement for automobile radar is that the diameter of the emitted radiation beam at a certain distance should be small enough (in relation to the target size) to accurately determine the position of detected object. It is also preferable that such radar be manufactured at a low cost in mass quantities.

Available radars suffer several limitations that make them unsuitable for automobile use. For example, their radiation beam diameter at a distance from the radar is generally dependent on the diameter of its antenna. Thus, larger antennas are required to produce smaller beam diameters. Accordingly, a sufficiently high resolution radar requires a large antenna, so that its size is impractical for automobile applications.

Additionally, in radars having multi-directional beams for performing spatial scanning, which are the kind of radars required for automotive applications, increasing the antenna diameter for higher resolution also requires increasing the longitudinal dimension of the radar, which makes it more difficult to utilize such radar for automotive applications.

Due to these limitations, currently available MM-wave radars used on some large vehicle such as buses have antenna diameters of 11 inches and can only resolve a vehicle at a maximum distance of 50 meters, and therefore are not satisfactory for practical application in automobiles or comparable vehicles.

It is therefore an object of the present invention to provide a compact MM wave radar that is small in size, has adequate range and resolution, consumes little power, and can be manufactured in mass quantities at low cost.

It is a further object of the present invention to provide an antenna including a lens, where the longitudinal dimension of the antenna is less than the focal length of the lens alone;

It is a further object of the present invention to provide a compact transceiver-feed assembly;

It is still a further object of the present invention to provide a heat sink for the transceiver-feed assembly as part of the antenna system.

SUMMARY OF THE INVENTION

In accordance with the invention, an antenna for directing electromagnetic radiation to or from a radiation source or detector is disclosed. The antenna comprises a lens for focusing such electromagnetic radiation and defining an axis of the antenna, a transreflector in a plane orthogonal to and disposed on said axis at a first distance from the lens, and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone.

In a preferred embodiment to the antenna, the lens is a plano-convex lens having its planar surface facing the twistreflector. Additionally, the transreflector is mounted on the planar surface of the lens.

Another preferred embodiment to the antenna comprises a plano-convex lens having its convex surface facing the twistreflector, and the transreflector is formed on the planar surface of the lens.

In another aspect of the present invention, a compact microwave and millimeter-wave radar for emitting and receiving electromagnetic radiation is disclosed. The radar comprises an antenna, RF circuit means for generating and receiving the electromagnetic radiation, and means for coupling the EM radiation from the RF circuit means to the antenna, and for coupling EM radiation from the antenna to the RF circuit means. The antenna comprises a lens for focusing such electromagnetic radiation and defining an axis of the antenna, a transreflector in a plane orthogonal to and disposed on said axis at a first distance from the lens, and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone.

BRIEF DESCRIPTION OF THE DRAWINGS

These and other features, objects, and advantages of the present invention will become more apparent from the following detailed description in conjunction with the appended drawings, in which:

FIG. 7 shows a cross-sectional view of an alternative to the first preferred embodiment;

FIG. 8 is a cross-sectional view of a second preferred embodiment; and

DESCRIPTION OF PREFERRED EMBODIMENTS

1. FIRST PREFERRED EMBODIMENT

1.1 General Description

Figure 1:
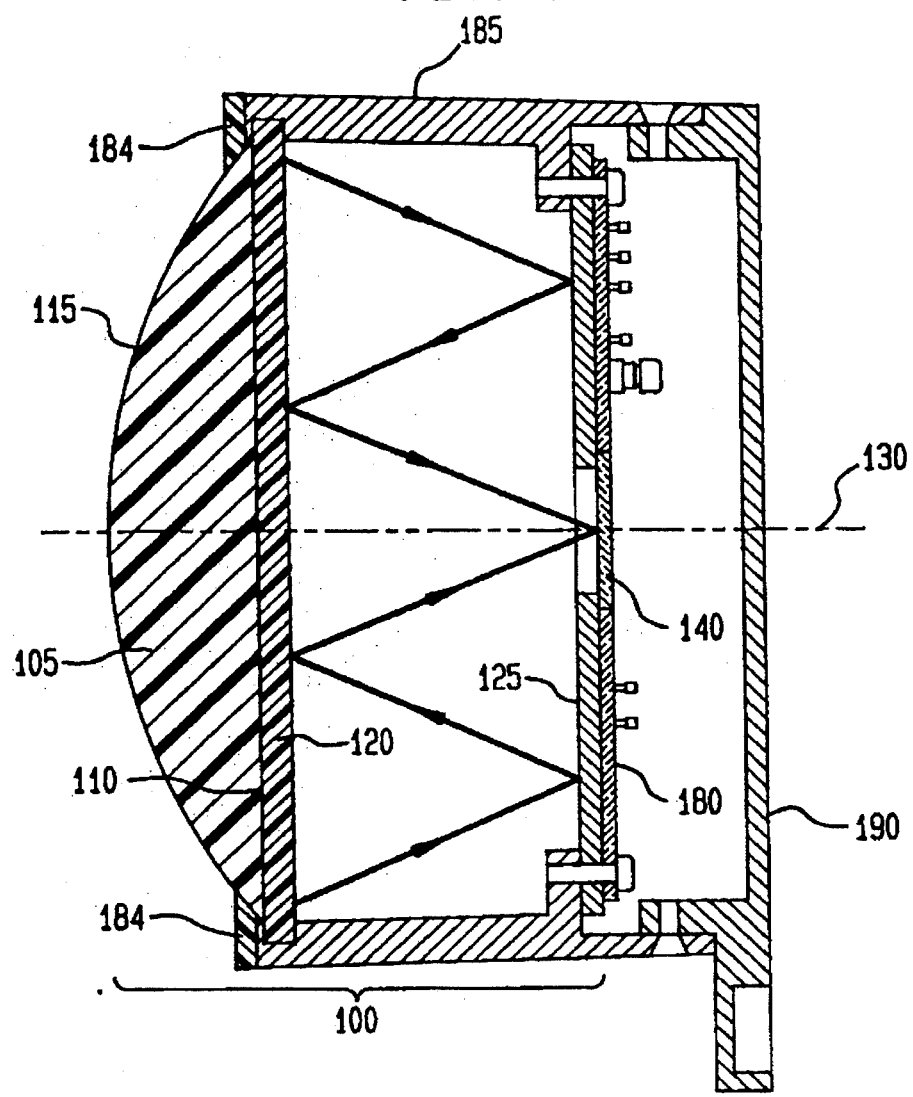
FIG. 1 illustrates a cross-sectional view of a first preferred embodiment.

As illustrated in FIG. 1, in a first preferred embodiment of the invention, a compact microwave and millimeter-wave radar comprises an antenna 100, a RF electronics board 140 and a support electronics board 180. The radar is enclosed in a housing 185 closed by a back cover 190, exposing a front end of the antenna for transmitting and receiving MM radiation. A ring-shaped fixture 184 is used to hold the front of lens 105.

The radar is a pulsed frequency modulated continuous wave (FM-CW) radar, and it operates in alternating transmitting and receiving intervals. During the transmitting intervals, the radar functions as a transmitter emitting MM radiation. During the receiving intervals, the radar receives the MM radiation reflected from the objects to be detected such as vehicles, and can provide at its output useful information derived from the received radiation, such as the speed and location of such vehicles.

Due to the compactness of the antenna and the RF and support electronics boards, described in detail below, the radar of this embodiment may have a small size, e.g. a diameter of approximately 145 millimeters and a length of approximately 100 millimeters. Additionally, the radar has a high resolution with a beam size of no more than 3.2 meters at a distance about 100 meters from the radar. The radar emits electromagnetic (EM) radiation at a frequency of about 77 Ghz, has a view range or operating range about 100 meters with an output power about several milliwatts, and has a power consumption only about one watt.

1.2 Antenna

As depicted in FIG. 1, antenna 100 comprises a lens 105 having a planar first surface 110 and a convex second surface 115. The curvature of the second surface is such that the lens properly images the far field with low aberration after one pass of the radiation through the lens. A transreflector 120 is disposed in a plane orthogonal to the lens axis; in this embodiment it is formed on planar first surface 110 of the lens. A twistreflector 125 is located in a plane orthogonal to the axis and opposing the first surface. The optical axis 130 of the lens and the transreflector define the direction in which the antenna transmits and from which it receives radiation.

An opening is formed around the center of twistreflector 125 which exposes a central portion of a back side of the RF electronic board 140, allowing the MM radiation generated by the RF electronics board to transmit to the antenna during the transmitting intervals and to provide the MM radiation received by the antenna to the RF electronics board during the receiving intervals.

Transreflector 120, formed on first surface 110, is a polarizer (also referred to as an analyzer) which passes only radiation having a particular polarization and substantially reflects radiation having an orthogonal polarization. The term "transreflector" in this application is intended not to be limited to the examples given in this specification, but to include any device that passes only radiation having a particular polarization and substantially reflects radiation having an orthogonal polarization.

Twistreflector 125 reflects incident radiation but gives it a 90 degree twist, so that it has a polarization orthogonal to that of the incident radiation. Thus, the polarization of linearly polarized incident radiation is effectively "twisted" 90° by the twistreflector 125.

Figure 2:
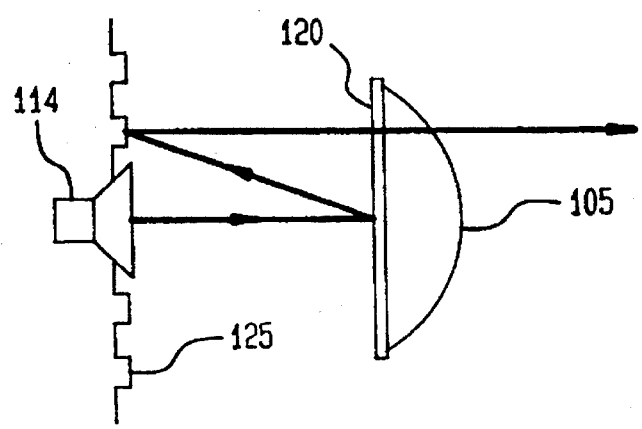
FIG. 2 illustrates the principles of operation for an antenna of the first preferred embodiment.

The operation of the radar is illustrated in FIG. 2. During the transmitting intervals, the MM radiation having the polarization substantially orthogonal to the transmission polarization of the transreflector is radiated from a radiation source 114 located at the center of the twistreflector 125. This radiation is substantially reflected by transreflector 120 toward twistreflector 125, which in turn reflects it back to the transreflector with its polarization rotated 90° so that it passes through the transreflector. The radiation then traverses lens 105 which collimates and focuses it before it is radiated from the antenna.

Referring to FIG. 1, during the receiving intervals, the radiation reflected from a detected object passes through lens 105 and, because the polarization of reflected radiation is aligned with the transmission polarization of the transreflector, it passes through transreflector 120 before being reflected by twistreflector 125. Because the radiation reflected from twistreflector 125 has a polarization orthogonal to the transmission polarization of transreflector 120, the radiation is reflected by the transreflector and is focused toward the center of twistreflector 125. Patch antennas, located on the back side of the RF electronics board and at the center of the twistreflector, receives the focused radiation and provides it to the receiver circuit located on a front side of RF electronic board 140.

Note that the arrows in FIG. 1 illustrate the direction of the received radiation within the antenna during the receiving intervals. During the transmitting intervals, the direction of the radiation within the antenna can be illustrated by reversing the direction of each of the arrows of FIG. 1.

The antenna of the present invention employs a plano-convex lens with a "folded optic" design. The folded optic design in this application refers to the fact that in the antenna, the actual distance between the lens and its focal point is less than the focal length of the lens alone.

The ratio of focal length of the antenna to the diameter of lens 105 is preferably maintained at around unity. Preferably, horizontal linear polarization is used because it tends to maximize the usual signal relative to clutter, or noise.

Figure 3:
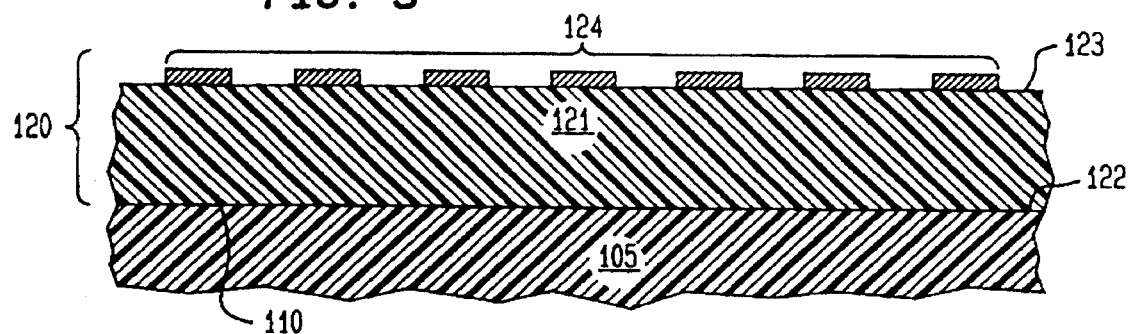
FIG. 3 shows a dielectric mounted grid transreflector employed in the first preferred embodiment.

Referring to FIG. 3, transreflector 120 is a dielectric mounted transreflector comprising a dielectric layer 121 having first and second surfaces 122 and 123, respectively, and a thin metal grid 124 formed on second surface 123 of the dielectric layer. First surface 122 of the dielectric layer is in contact with first surface 110 of lens 105. The thickness of dielectric layer 121 is about a quarter wavelength of the MM radiation in the dielectric layer. The transreflector may be formed on the lens by first depositing dielectric layer 121 on surface 110 of the lens, and then forming metal grid 124 on the dielectric layer. As is well known in the art, a transreflector reflects radiation having an electrical field polarized parallel to its grid lines, and transmits radiation having an electrical field polarized orthogonally to the grid lines.

Figure 4A:
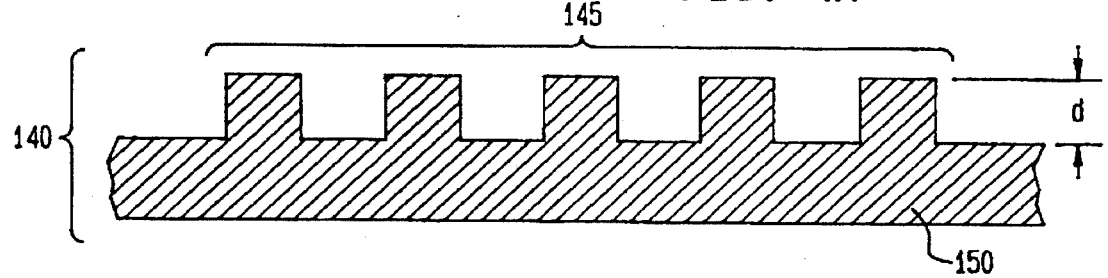
FIGS. 4A–D depict the cross-sections of four types of twistreflectors.
Figure 4B:
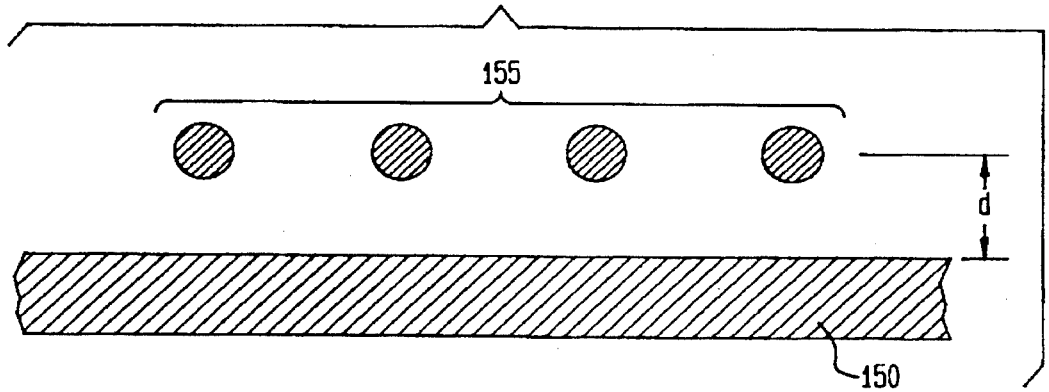
Figure 4C:
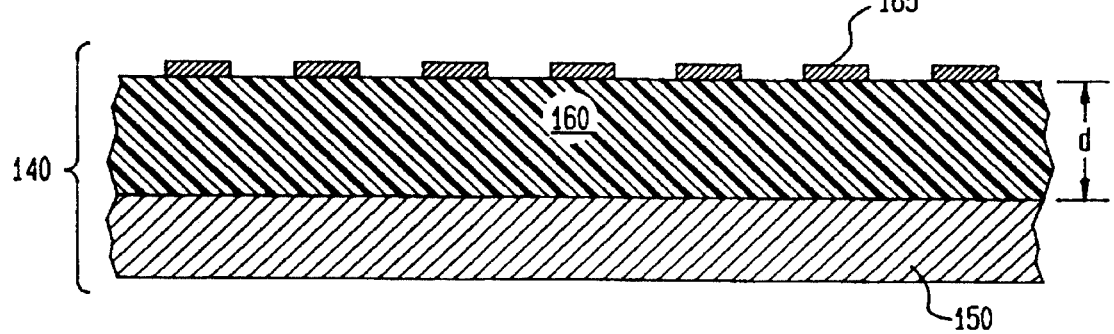

Referring to FIG. 4A, twistreflector 140 comprises a metal grid 145 integrally formed on a metal plate 150. The height of the metal grid, d, is a quarter wavelength of the EM radiation. Alternatively, as illustrated in FIG. 4B, a twistreflector can also be formed by placing a metal wire grid 155 above metallic plate 150 at a distance, d, of a quarter wavelength of the EM radiation. Further, referring to FIG. 4C, a twistreflector may also be formed by depositing a dielectric film 160 on a metallic plate 150, and placing a dielectric grid 165 as a polarizer on dielectric film 160. In this structure, the thickness of dielectric film 160 is about a quarter wavelength of the radiation in the film. All of the above-described twistreflectors have polarizations in the same direction as their metal grid lines.

Figure 4D:
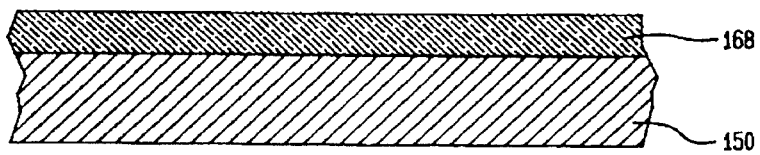

FIG. 4D illustrates yet another twistreflector which comprises a quarterwave plate 168 formed on a metal plate or metal surface 150. As is well known to those skilled in the art, a quarterwave plate is an anisotropic optical element which introduces a relative phase shift of 90 degrees between two orthogonal components of an EM wave. Incident radiation having a linear polarization that is 45 degrees to two orthogonal principle axes of the quarterwave plate is transformed into a circularly polarized radiation by the quarterwave plate. Similarly, incoming circularly polarized radiation emerges linearly polarized after the quarterwave plate.

A quarterwave plate is usually made of an optically anisotropic material, which normally has a thickness of one quarter free-space wavelength of the radiation divided by the absolute difference between the indices of refraction along the two principle axes of the material, respectively. For more detailed information about the operation principles and the construction of the quarterwave plate, see Hecht and Zajac, "OPTICS", Addison-Wesley Publishing Company, 1979, pp. 249–250, which is incorporated herein by reference.

The above-described twistreflectors are generally known in the art; any other appropriate form of twistreflectors may also be used in accordance with the invention.

There are many variations to the abovedescribed antenna. For example, instead of covering the entire first surface of the lens, a transreflector covering a sufficient central area of the first surface of the lens can be utilized.

1.3 RF and Support Electronics Board

Figure 5A:
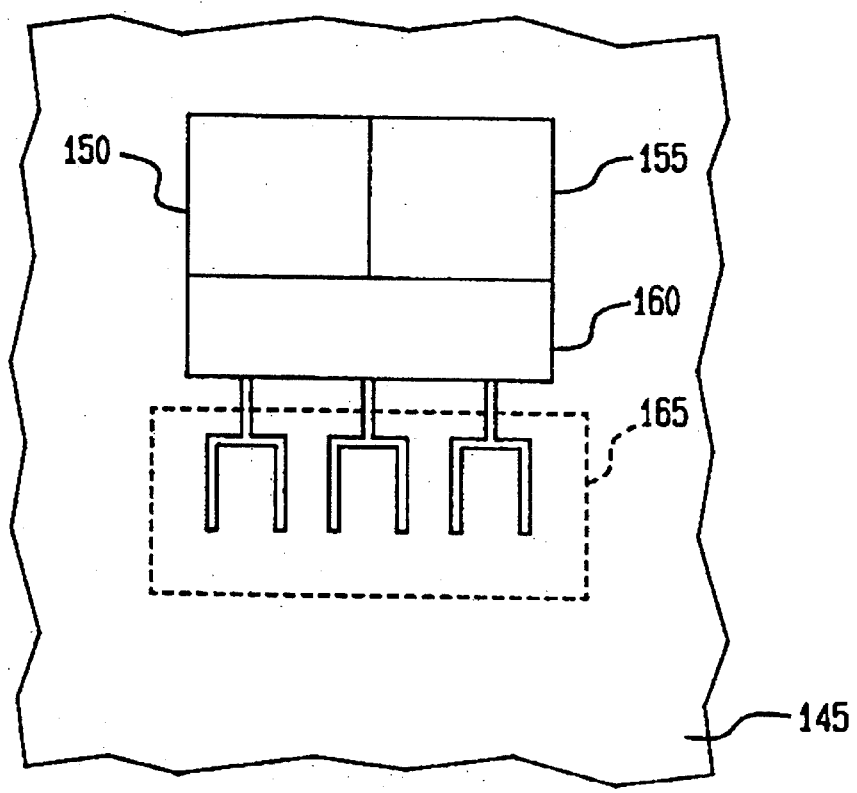
FIG. 5A shows a back views of an RF electronics board.

The top view of a front side of the RF electronics board from is depicted in FIG. 5A. The RF electronic board comprises a substrate 145, voltage controlled oscillation generation circuits 150, receiving circuits 155, PIN matrix switching circuits 160, and three MM strip transmission lines 165 connected to the PIN matrix switching circuit.

Figure 5B:
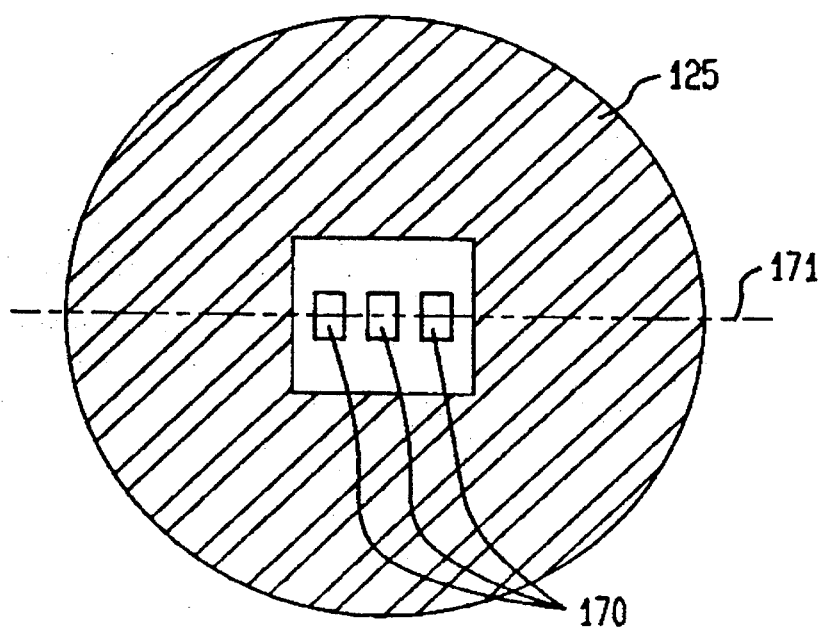
FIG. 5B is a front view of the RF electronics board which is attached to a twistreflector.

Referring to FIG. 5B, the back side of the substrate is attached to the back side of the twistreflector. Three aperture coupled patch antennas 170 are exposed to the antenna of the radar through a central opening in the twistreflector. Preferably, the middle patch antenna is centered at the intersection between optical axis 130 and substrate 145. Each of the three patch antennas comprises a 2×2 array of single patch elements. Two of the four elements in each array correspond to and are aligned with the end portion of one of the transmission lines.

Figure 5C:
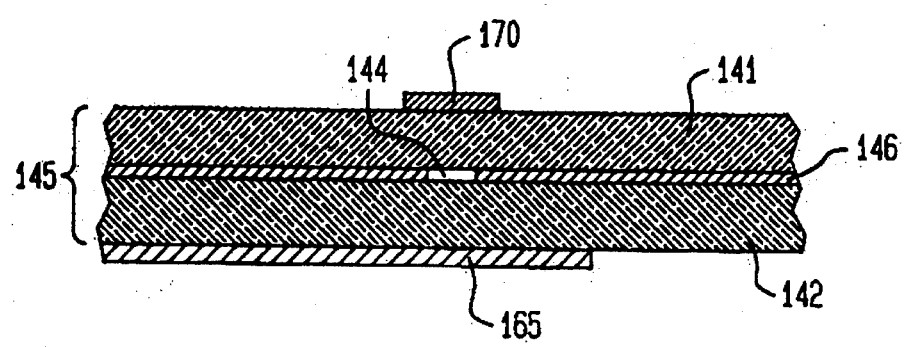
FIG. 5C shows the cross-sectional view of a aperture coupled patch antenna.

FIG. 5C is a cross-sectional view of a patch element 170 coupled to a transmission line 165 via substrate 145. Substrate 145 comprises a metal ground plane 146 interposed between an antenna dielectric layer 141 and a feed dielectric layer 142. Apertures 144 are formed in the metal ground plane. Patch element 170, apertures 144 and the end portions of transmission lines 165 are vertically aligned to couple the EM radiation between the patch antenna and the transmission lines via the aperture. For a general description of the formation of aperture coupled patch antenna, see James, J. R., and Hall, P. S., "HANDBOOK OF MICROSTRIP ANTENNAS", vol. 1, Peter Peregrinus Ltd. of London, 1989, which is incorporated herein by reference.

A single oscillator is utilized in the RF electronics board to generate oscillations at a transmitting frequency (or transmitting frequencies) during the transmitting intervals; it functions as a local oscillator ("LO") at a local oscillator frequency (or frequencies) in the receiving intervals.

Figure 5D:
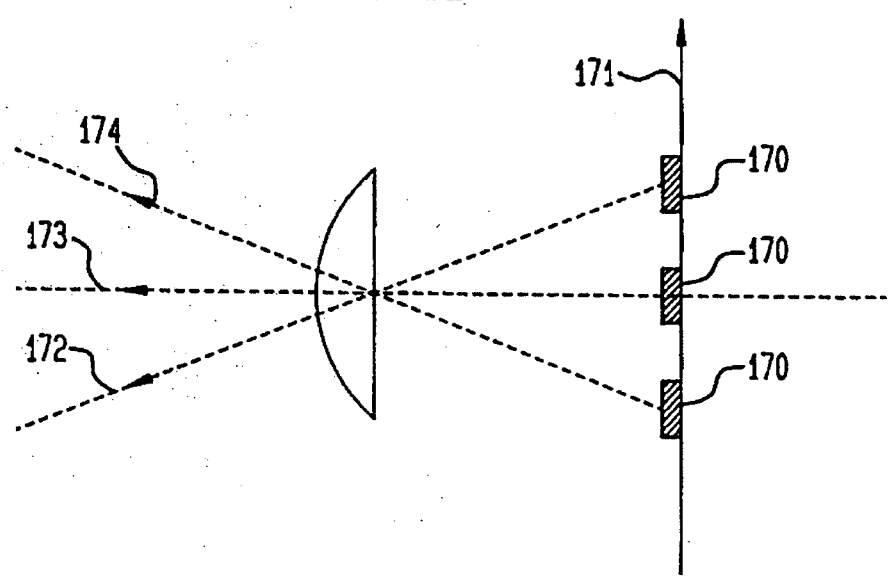
FIG. 5D illustrates the principle of multi-beam spatial scanning of the radar of the present invention.

Referring to FIG. 5D, the radar employs a multi-directional beam scanning. During the transmitting intervals, the MM radiation generated by the oscillator is sequential provided to each of the transmission lines via the PIN matrix switch circuit. The PIN matrix switching circuit comprises a PIN diode matrix it is utilized to switch the EM radiation between the transmission lines. Since the end portions of the transmission lines are aligned to the respective patch antennas via the apertures, the EM radiation on the transmission lines is coupled to the corresponding patch antennas and emits out.

During the transmitting intervals, the PIN matrix switching circuits sequentially send the EM radiation to the transmission lines which couples the EM radiation to the patch antennas. As a result, the radiation is spatially scanned along a direction 171. More specifically, radiation originated from the top, center, and lower patch antennas results in focused and collimated beams in directions 172, 173 and 174, respectively. Thus spatial scanning along direction 171 is accomplished electronically with multi-directional beams without employing any mechanical movement. For automobile applications, axis 171 is horizontal., i.e. parallel to the ground or road. Note that in FIG. 5D, for simplicity, only the elements necessary for demonstrating the multiple beam scanning are shown.

As is described above, azimuthal scanning is achieved in this preferred embodiment by multi-directional beam scanning using the PIN matrix switching circuits. Alternatively, spatial scanning may also be obtained by oscillating the twistreflector. In applications such as an aircraft, elevational scanning may also be provided.

The receiving circuits include mixer circuits and Intermediate Frequency (IF) amplifier circuits for homodyne detection. Clearly, other circuits can also be incorporated on the RF electronics board.

Preferably, the oscillator is a GaAs or InP Gunn oscillator, and the receiving circuits are Monolithic Millimeter-wave Integrated Circuits (MMICs). Monolithic integrated circuits provide well controlled reduced parasitic capacitance and inductance as compared with hybrid circuits, thus allowing repeatable high frequency operation. The oscillator, the monolithic receiving circuits, the PIN matrix switching circuit, and the transmission lines are all located and form as hybrid circuits on substrate 145 and more specifically, second dielectric layer 142 of the substrate.

Figure 6:
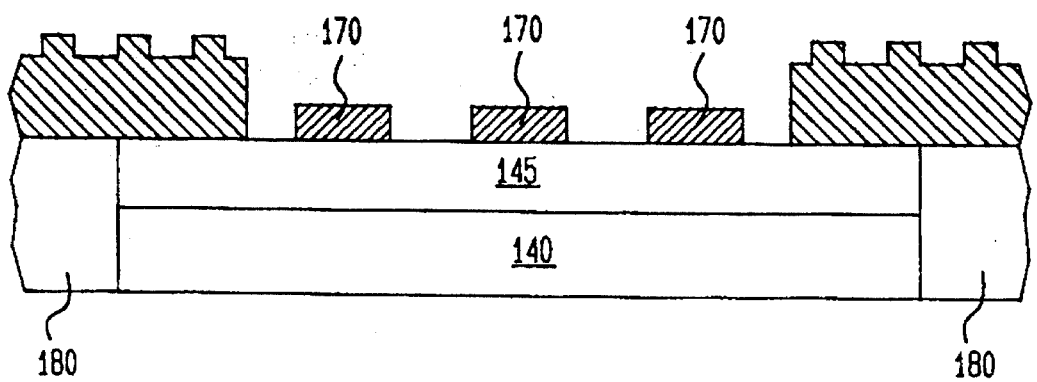
FIG. 6 is a cross-sectional view of the RF electronics board attached to a twistreflector.

FIG. 6 illustrates the cross-sectional views of the RF electronic board attached to the twistreflector. As illustrated, the back side of the twistreflector is attached to the back side of the substrate RF electronics board. The twistreflector has a central opening which exposes patch antennas to the antenna of the radar. In addition to its compactness, this structure also offers the advantage that the twistreflector functions as a heat-sink for removing heat generated by the circuits on the RF board and the support electronics board. Recall that the twistreflector is preferably made of a metal plate, which is a good heat conductor.

This preferred embodiment employs microstrip transmission lines 165. However, the transmission lines other than the microstrip transmission lines may also be utilized. As is well known to those skilled in the art, they may include but are not limited to other forms of transmission line such as stripline, slotline, and coplanar waveguide.

As for the feeds of the radar, they are not limited to the described aperture coupled patch antenna array. Alternatives include but are not limited to probe fed patch antennas, dipole antennas, slot antennas, aperture antennas, wire antennas, and many other types of antennas that are well known to those skilled in the art.

The support electronics board contains other non-RF circuits formed with discrete electronic components and/or integrated circuits. It is interconnected to the RF electronics board and it functions as an interface between the RF electronic board and any outside instruments or circuits. In addition, the support electronics board also contains circuits for providing power to the RF electronics board. It will be apparent to one skilled in the art that various other kinds of circuits may be used in or added to the RF and support electronics boards, and that they may be arranged and configured in other ways consistent with their functions in accordance with the invention.

1.5 Alternative Embodiment

An alternative embodiment of the invention is depicted in FIG. 7. For simplicity, like elements are similarly designated as in FIG. 1.

In this alternative embodiment, both surfaces 115 and 110 of lens 105 are curved surfaces, with surface 115 being a convex shape and surface 110 a concave shape. Transreflector 120 only covers a central portion of first surface. An Input/Output adapter 181 connected to the Support Electronics Board is provided and a detachable connector (not shown) can be easily connected to the adapter. The rest of this radar system and its principles of operation are similar to the first preferred embodiment, and thus are not described in detail here.

As is for the first preferred embodiment, the transreflector of this radar may be placed on or adjacent to the second surface of the lens instead of on or near the first surface of the primary lens.

In another alternative embodiment, the twistreflector may be curved to form a concave shape toward the lens, such that in conjunction with the particular lens the antenna operates in accordance with the invention as described above. While particular designs of lens and curved twistreflector in this fashion may be more difficult to calculate than where the twistreflector is planar, they may afford greater efficiencies in terms of compactness.

2. SECOND PREFERRED EMBODIMENT 2.1 General Description

The cross-section of the second preferred embodiment, which is especially preferred by virtue of its compactness, is illustrated in FIG. 8. This radar comprises an MM antenna 200, an RF electronics board 240, and a support electronics board 280, all enclosed in a housing 285 closed by a back cover 230. The main difference between the hardware of this radar and that of the first preferred embodiment is the geometry and the orientation of the lens in the antenna.

The antenna in this radar employs a plano-convex lens 205. In this preferred embodiment, because the beam normally makes three passes through the lens, lens 205 is referred hereinafter as a triconvex lens. The curved surface of the triconvex lens faces the twistreflector and achieves antenna results similar to that of the first preferred embodiment but with a much reduced length. This radar measures at approximately 145 millimeter in diameter and only 85 millimeters long. It is capable of providing a beam of no more than 3.2 meters in diameter at a distance about 100 meters from the radar.

2.2 Antenna

As illustrated in FIG. 8, the antenna comprises a triconvex lens 205 having a convex first surface 205 and a planar second surface 215, a transreflector 220 formed on the planar second surface, and a twistreflector 225, all placed along an optical axis 230. A central opening is formed in the twistreflector, exposing patch antennas formed on the back side of RF electronics Board 240. The transreflector, twistreflector, RF and Support Electronic Boards in this referred embodiment are identical to those in the first preferred embodiment. However, unlike the lens of the first preferred embodiment, the lens of this radar has a planohyperbolic geometry.

The types of lenses used in the first and second preferred embodiments are generally known, which are described in detail in, for example, Silver, S., "MICROWAVE ANTENNA THEORY AND DESIGN," Peter Peregrinus Ltd. of London, pp. 388–412, 1984, which is incorporated herein by reference.

Figure 9:
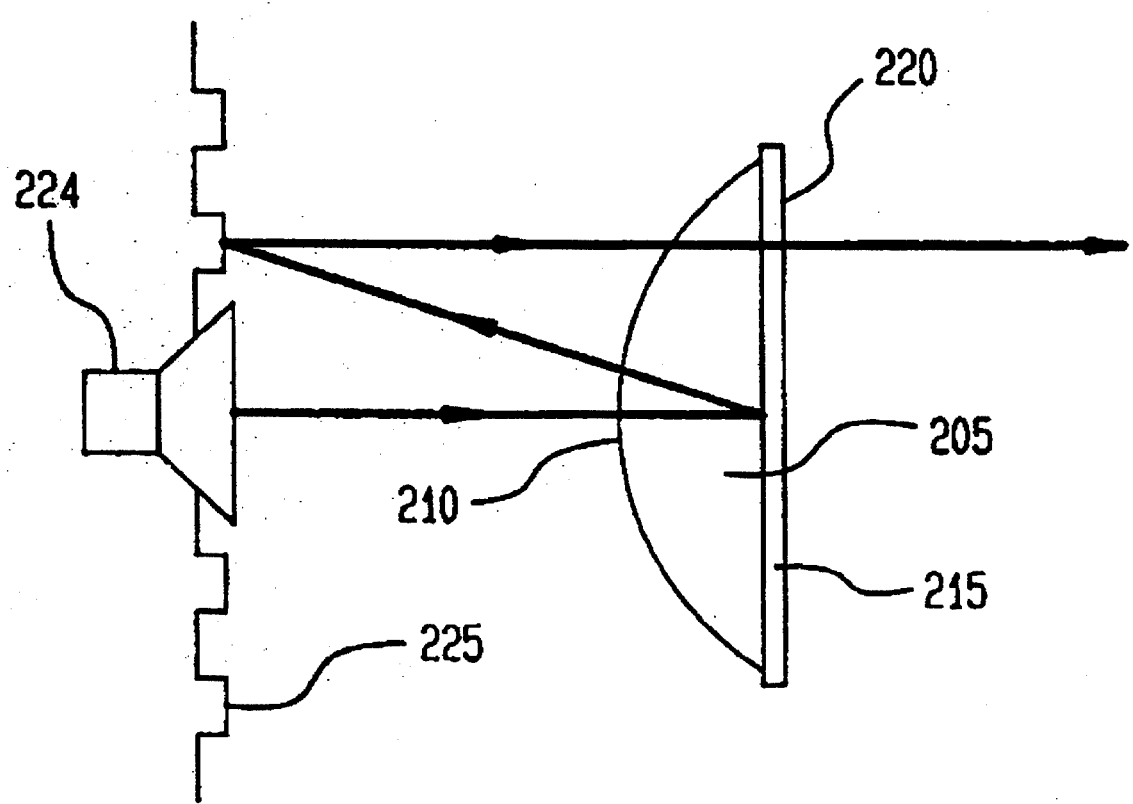
FIG. 9 illustrates the operation of the antenna of the second preferred embodiment.

For the purpose of explanation, a simplified version of this antenna is illustrated in FIG. 9. Millimeter wave beam emitted from a radiation source 224 and having a polarization orthogonal to the transmission polarization of transreflector 215 makes its first pass of lens 205 and is then reflected by transreflector 215. The reflected radiation then passes lens 205 the second time and is reflected by twistreflector 225, which twisted the polarization of the radiation 90 degrees so that it becomes aligned to the transmission polarization of transreflector 215. Because the beam reflected from the twist-reflector now has the same polarization as the transmission polarization of the transreflector, it traverses the triconvex lens the third time and the transreflector and it is focused and collimated by the triconvex lens before being emitted out from the antenna.

As for the rest of the radar such as the RF electronics board and the support electronics board, they may be similar to that of the first preferred embodiment, thus are not described in detail. Any transmitter and receiver circuit may be used which provide the function required and described herein in accordance with the invention. While the descriptions herein are of systems using horizontal linear polarization, other forms of polarization may also be used, such as circular polarization, and they are within the scope of the invention.

It will be apparent to those skilled in the art that numerous modifications may be made within the scope of the invention, which is defined in accordance with the following claims.

What is claimed is:

1. An antenna for directing electromagnetic radiation to or from a radiation source or detector comprising:

a plano-convex lens for focusing such electromagnetic radiation and defining an axis of the antenna;

a transreflector in a plane orthogonal to and disposed on said axis at a first distance from the lens; and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone, said plano-convex lens having the planar surface facing the twistreflector.

2. The antenna of claim 1 wherein said transreflector is formed on the planar surface of the lens.

3. The antenna of claim 2 wherein said transreflector is a dielectric mounted grid.

4. The antenna of claim 3 wherein said twistreflector comprises a metal plate having metal grid formed on a surface of said plate, the height of the metal grid is about a quarter wavelength of the electromagnetic radiation that is transmitted from the antenna, and the metal grid is positioned to face the lens.

5. The antenna of claim 3 wherein said twistreflector comprises a free standing metal wire grid parallel to and disposed above a metallic surface, the distance between the grid and the surface being about a quarter wavelength of the electromagnetic radiation that is transmitted from said antenna, and the metal wire grid is positioned to face the lens.

6. The antenna of claim 3 wherein the twistreflector comprises a metal plate, a dielectric film formed on the plate, and a thin metal grid formed on the dielectric film, the thickness of the dielectric film being about a quarter wavelength of an electromagnetic radiation in the dielectric film.

7. The antenna of claim 3 wherein the twistreflector comprises a metal plate and a quarterwave plate formed on or attached to said metal plate, and the quarterwave plate is positioned to face the lens.

8. The antenna of claim 1 wherein the twistreflector has a central opening exposing the radiation source or detector to the antenna.

9. An antenna for directing electromagnetic radiation to or from a radiation source or detector comprising:

a plano-convex lens for focusing such electromagnetic radiation and defining an axis of the antenna;

a transreflector in a plane orthogonal to and disposed on said axis at a first distance from the lens; and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone, said plano-convex lens having the convex surface facing the twistreflector.

10. The antenna of claim 9 wherein said convex surface of the lens has a hyperbolic geometry.

11. The antenna of claim 9 wherein said transreflector is formed on the planar surface of the lens.

12. The antenna of claim 11 wherein said transreflector is a dielectric mounted grid.

13. The antenna of claim 12 wherein said twistreflector comprises a metal plate having metal grid formed on a surface of said plate, the height of the metallic grid being about a quarter wavelength of the electromagnetic radiation that is transmitted from the antenna, and the metal grid is positioned to face the lens.

14. The antenna of claim 12 wherein said twistreflector comprises a free standing metal wire grid parallel to and disposed above a metal surface, the distance between the grid and the surface being about a quarter wavelength of the electromagnetic radiation that is transmitted from said apparatus, and the metal wire grid is positioned to face the lens.

15. The antenna of claim 12 wherein the twistreflector comprises a metal plate, a dielectric film formed on the plate, and a thin metal grid formed on the dielectric film, the thickness of the dielectric film being about a quarter wavelength of the electromagnetic radiation in the dielectric film.

16. The antenna of claim 12 wherein the twistreflector comprises a metal plate and a quarterwave plate formed on or attached to said metallic plate, and the quarterwave plate is positioned to face the lens.

17. The antenna of claim 9 wherein the twistreflector has a central opening exposing the radiation source or detector to the antenna.

18. An antenna for directing electromagnetic radiation to or from a radiation source or detector comprising:

a convex-concave lens for focusing such electromagnetic radiation and defining an axis of the antenna;

a transreflector in a plane orthogonal to and disposed on said axis at a first distance from the lens; and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone, said convex-concave lens having the concave surface facing the twistreflector.

19. The antenna of claim 18 wherein said transreflector is formed on the concave surface of the lens.

20. A compact microwave and millimeter wave radar for emitting and receiving electromagnetic radiation comprising:

an antenna comprising:

a plano-convex lens for focusing such electromagnetic radiation and defining an axis of the antenna, a transreflector in a plane orthogonal to and disposed on said axis at a first distance from the lens, and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone, said plano-convex lens having the planar surface facing the twistreflector;

RF circuit means for generating and receiving the electromagnetic radiation; and means for coupling the EM radiation from the RF circuit means to the antenna, and for coupling EM radiation from the antenna to the RF circuit means.

21. The radar of claim 20 wherein the twistreflector has a central opening, and wherein the means for coupling the EM radiation comprises a substrate comprising a metal ground plane interposed between antenna and feed dielectric layers, at least one patch antenna formed on the outer surface of antenna layer and transmission lines formed on the outer surface of the feed dielectric layer, the metal ground plane has coupling aperture aligning to both the patch antenna and the transmission lines for coupling the EM radiation between the patch antenna and the transmission lines, and wherein the patch antenna is aligned to the opening in the twistreflector to couple the EM radiation to or from the antenna of the radar, and wherein the RF electronic circuit means are placed to the outer surface of the feed layer and are connected to the transmission lines.

22. The radar of claim 21 wherein the outer surface of the antenna substrate is attached to a backside of the twistreflector.

23. The radar of claim 22 wherein the twistreflector is also a heat sink for dissipating heat generated by the RF electronic means.

24. The radar of claim 20 wherein the RF electronic circuit means comprise a single oscillator for generating an oscillation at a transmitting frequency during transmitting intervals, and for providing an oscillation at a local oscillator frequency during receiving intervals.

25. The radar of claim 23 wherein the oscillator is a GaAs or InP Gunn diode.

26. The radar of claim 20 wherein the RF circuit means comprise PIN matrix switching circuits.

27. The radar of claim 20 further comprising support electronic circuit means interconnected to the RF circuit means.

28. The radar of claim 20 wherein the transreflector is formed on the planar surface of the lens.

29. The radar of claim 28 wherein said transreflector is a dielectric mounted grid.

30. The radar of claim 29 wherein said twistreflector comprises a metal plate having metal grid formed on a surface of said plate, the height of the metallic grid being about a quarter wavelength of the electromagnetic radiation that is transmitted from the antenna, and the metal grid is positioned to face the transreflector.

31. The radar of claim 29 wherein said twistreflector comprises a free standing metal wire grid parallel to and disposed above a metal surface, the distance between the grid and the surface being about a quarter wavelength of the electromagnetic radiation that is transmitted from said apparatus, and the metal wire grid is positioned to face the transreflector.

32. The radar of claim 29 wherein the twistreflector comprises a metal plate, a dielectric film formed on the plate, and a thin metal grid formed on the dielectric film, the thickness of the dielectric film being about a quarter wavelength in the dielectric film of an electromagnetic radiation that is transmitted from the antenna.

33. The radar of claim 29 wherein the twistreflector comprises a metal plate and a quarterwave plate formed on or attached to said metal plate, and the quarterwave plate is positioned to face the transreflector.

34. A compact microwave and millimeter wave radar for emitting and receiving electromagnetic radiation comprising:

an antenna comprising:

a plano-convex lens for focusing such electromagnetic radiation and defining an axis of the antenna, a transreflector in a plane orthogonal to and disposed on said axis at a first distance from the lens, and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone, said plano-convex lens having the convex surface facing the twistreflector;

RF circuit means for generating and receiving the electromagnetic radiation; and means for coupling the EM radiation from the RF circuit means to the antenna, and for coupling EM radiation from the antenna to the RF circuit means.

35. The radar of claim 34 wherein said transreflector is formed on the planar surface of the lens.

36. The radar of claim 35 wherein said transreflector is a dielectric mounted grid.

37. The radar of claim 36 wherein said twistreflector comprises a metal plate having metal grid formed on a surface of said plate, the height of the metal grid being about a quarter wavelength of the electromagnetic radiation that is transmitted from the antenna, and the metal grid is positioned to face the transreflector.

38. The radar of claim 36 wherein said twistreflector comprises a free standing metal wire grid parallel to and disposed above a metallic surface, the distance between the grid and the surface being about a quarter wavelength of the electromagnetic radiation that is transmitted from said apparatus, and the metal wire grid is positioned to face the transreflector.

39. The radar of claim 36 wherein the twistreflector comprises a metal plate, a dielectric film formed on the plate, and a thin metal grid formed on the dielectric film, the thickness of the dielectric film being about a quarter wavelength in the dielectric film of an electromagnetic radiation that is transmitted from the antenna.

40. The radar of claim 36 wherein the twistreflector comprises a metal plate and a quarterwave plate formed on or attached to said metallic plate, and the quarterwave plate is positioned to face the transreflector.

41. A compact microwave and millimeter wave radar for emitting and receiving electromagnetic radiation comprising:

an antenna comprising:

a convex-concave lens for focusing such electromagnetic radiation and defining an axis of the antenna, a transreflector in a plane orthogonal to and disposed on said axis at a first distance from the lens, and a twistreflector substantially in a plane orthogonal to and disposed on said axis at a second distance greater than said first distance from the lens such that the far field along the axis is focused at a point near the intersection of the twistreflector and the axis, which point is closer to the lens than the focal point of the lens alone, said convex-concave lens having the concave surface facing the twistreflector;

RF circuit means for generating and receiving the electromagnetic radiation; and means for coupling the EM radiation from the RF circuit means to the antenna, and for coupling EM radiation from the antenna to the RF circuit means.

42. The radar of claim 41 wherein said transreflector is formed on the concave surface of the lens.

* * * * *